US012638113B2

(12) United States Patent
Zhang

(10) Patent No.: US 12,638,113 B2
(45) Date of Patent: May 26, 2026

(54) CONNECTOR DEVICE

(71) Applicant: A. RAYMOND ET CIE, Grenoble (FR)

(72) Inventor: Chao Zhang, Suzhou (CN)

(73) Assignee: A. RAYMOND ET CIE, Grenoble (FR)

( * ) Notice: Subject to any disclaimer, the term of this patent is extended or adjusted under 35 U.S.C. 154(b) by 25 days.

(21) Appl. No.: 18/992,716

(22) PCT Filed: Apr. 6, 2023

(86) PCT No.: PCT/CN2023/086617
§ 371 (c)(1),
(2) Date: Jan. 9, 2025

(87) PCT Pub. No.: WO2024/036989
PCT Pub. Date: Feb. 22, 2024

(65) Prior Publication Data
US 2026/0009483 A1     Jan. 8, 2026

(30) Foreign Application Priority Data
Aug. 17, 2022    (CN) .......................... 202210986786.3

(51) Int. Cl.
*F16L 29/04*        (2006.01)
*F16L 37/56*        (2006.01)
*F16L 39/00*        (2006.01)

(52) U.S. Cl.
CPC ............... *F16L 29/04* (2013.01); *F16L 37/56* (2013.01); *F16L 39/00* (2013.01)

(58) Field of Classification Search
CPC ............ F16L 37/56; F16L 29/04; F16L 39/00
See application file for complete search history.

(56) References Cited

U.S. PATENT DOCUMENTS 3,582,096 A * 6/1971 Norton .................... F16L 39/00
                                                    277/606
3,950,017 A * 4/1976 Beurer .................... F16L 39/00
                                                    285/121.6
(Continued)

FOREIGN PATENT DOCUMENTS

CN        213177219 U      5/2021
CN        216158545 U      4/2022
(Continued)

OTHER PUBLICATIONS

International Search Report for PCT/CN2023/086617 dated May 24, 2023, 4 pages.
(Continued)

*Primary Examiner* — Umashankar Venkatesan
(74) *Attorney, Agent, or Firm* — WARNER NORCROSS + JUDD LLP

(57)        ABSTRACT

A connector device includes a floating connector assembly and a mating connector assembly. The floating connector assembly includes a base, a floating connector and first and second floating units. The first floating unit includes a through hole for receiving the floating connector and allows the floating connector to move in a radial direction of the through hole and to tilt relative to an axial direction of the through hole. The second floating unit is movable relative to the base in a direction perpendicular to the base plane. The mating connector assembly includes a mating connector. A valve assembly of the floating connector and a valve unit of the mating connector switched to open state after the floating connector is connected with the mating connector. The second floating unit is movable to varied floating positions after the valve assembly and the valve unit are switched to the open state.

12 Claims, 7 Drawing Sheets

(56)                References Cited

U.S. PATENT DOCUMENTS

| | | | | |
|---|---|---|---|---|
| 4,676,563 | A * | 6/1987 | Curlett | F16L 39/00 |
| | | | | 285/123.3 |
| 5,464,042 | A * | 11/1995 | Haunhorst | F24F 13/0209 |
| | | | | 137/614.04 |
| 7,401,753 | B2 * | 7/2008 | Bozmoski | F16L 39/00 |
| | | | | 248/316.1 |
| 9,114,687 | B2 * | 8/2015 | Dorland | F16L 39/00 |
| 11,796,104 | B2 * | 10/2023 | Gurupackiam | F16L 47/12 |
| 12,234,938 | B2 * | 2/2025 | Zhang | F16L 37/56 |
| 2007/0108761 | A1 * | 5/2007 | Ko | F16L 37/091 |
| | | | | 285/317 |
| 2009/0051161 | A1 * | 2/2009 | Ekstrom | F16L 39/00 |
| | | | | 285/29 |
| 2012/0153095 | A1 * | 6/2012 | Child | F16L 55/035 |
| | | | | 248/68.1 |
| 2016/0066480 | A1 | 3/2016 | Eckberg et al. | |
| 2022/0021052 | A1 * | 1/2022 | Zhang | H01R 13/6315 |
| 2023/0094260 | A1 * | 3/2023 | Durieux | F16L 29/04 |
| | | | | 251/149.6 |

FOREIGN PATENT DOCUMENTS

| | | | |
|---|---|---|---|
| EP | 4155596 | A1 | 3/2023 |
| JP | 2009150449 | A | 7/2009 |
| JP | 2012122603 | A | 6/2012 |
| JP | 2013504026 | A | 2/2013 |
| JP | 2022515641 | A | 2/2022 |
| WO | 2015020667 | A1 | 2/2015 |
| WO | 2022031918 | A1 | 2/2022 |

OTHER PUBLICATIONS

Written Opinion of the International Searching Authority for PCT/CN2023/086617 dated May 24, 2023, 7 pages.

Machine assisted English translation of CN216158545U obtained from https://worldwide.espacenet.com/ on Mar. 4, 2026, 25 pages.

Machine assisted English translation of CN213177219U obtained from https://worldwide.espacenet.com/ on Mar. 4, 2026, 11 pages.

Machine assisted English translation of JP2012122603A obtained from https://worldwide.espacenet.com/ on Mar. 4, 2026, 22 pages.

Machine assisted English translation of JP2009150449A obtained from https://worldwide.espacenet. com/ on Mar. 4, 2026, 12 pages.

* cited by examiner

[ Fig. 1]
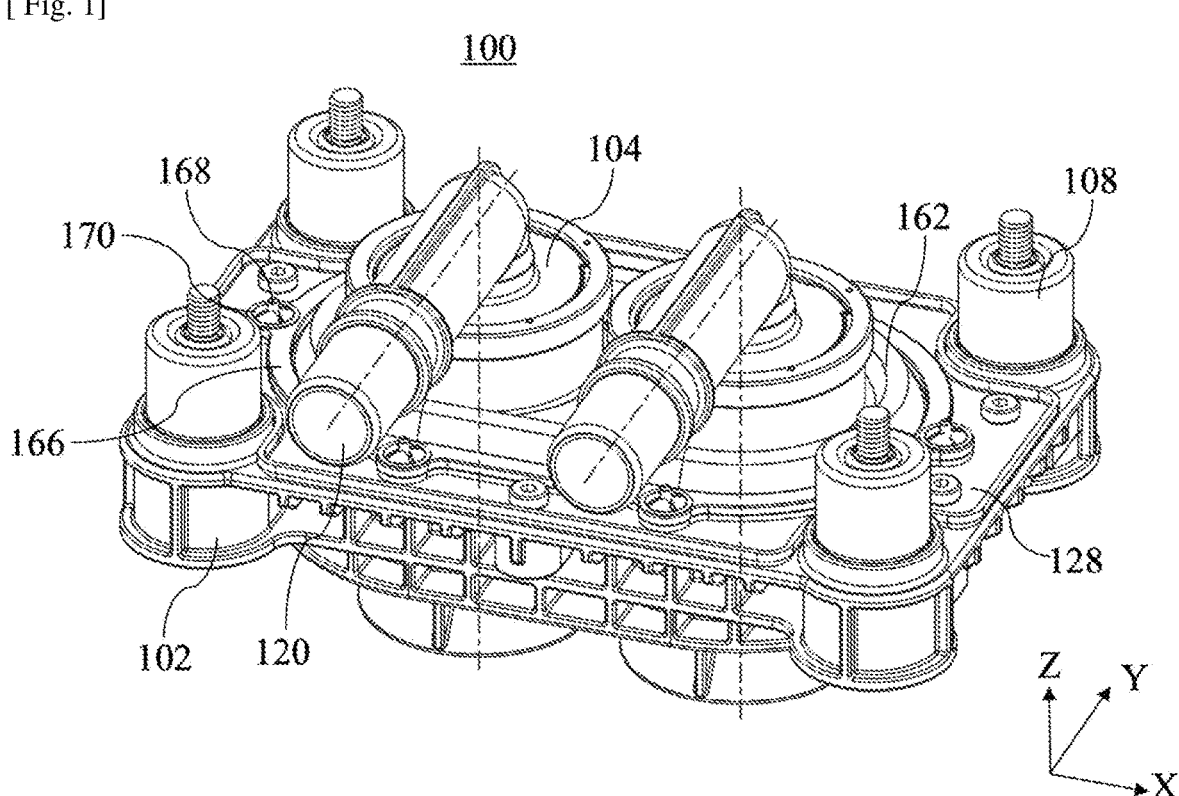
[ Fig. 2]
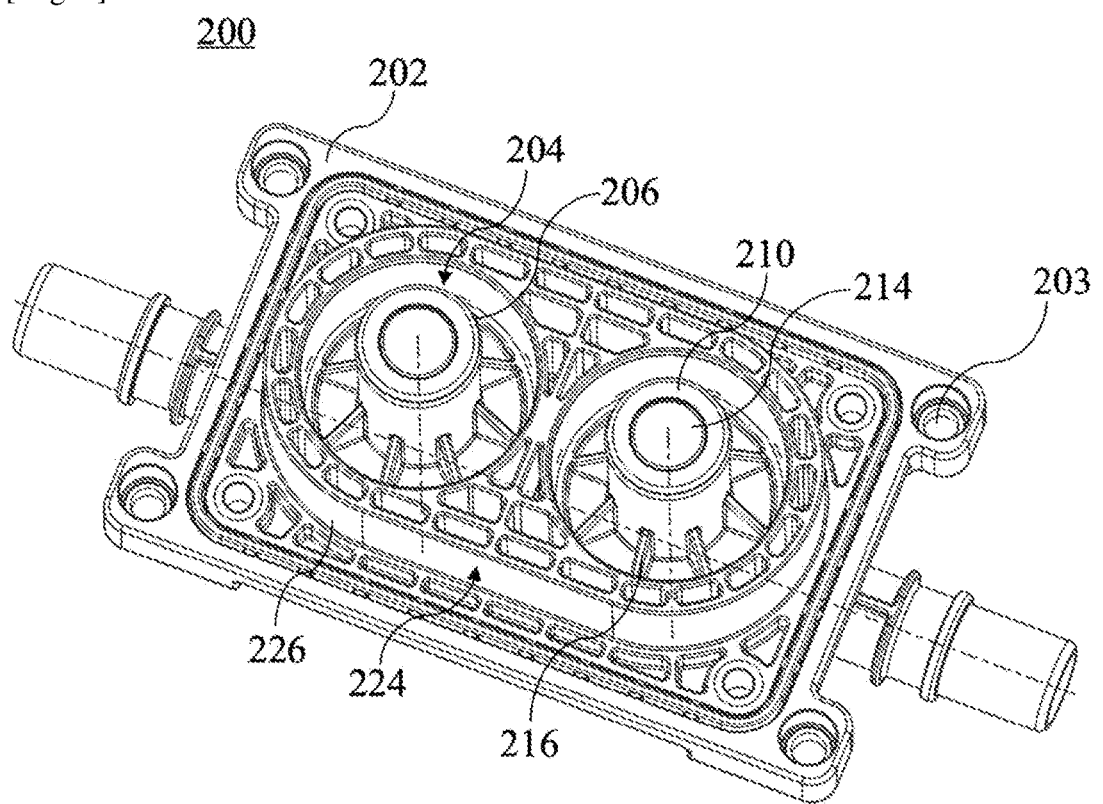

[ Fig. 3]
<u>10</u>
104
114
120
116
129
162
164
108
168
110
166
128
106
130
102
224
124
202
118
112
126
Z
208 210
122 123
212
204
[ Fig. 4A]
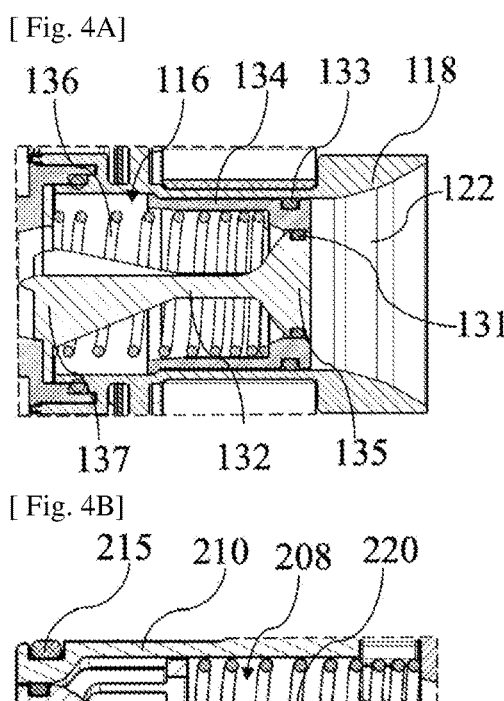
136   116   134   133   118
122
131
137   132   135
[ Fig. 4B]
215   210   208   220
222   218

[ Fig. 4C]
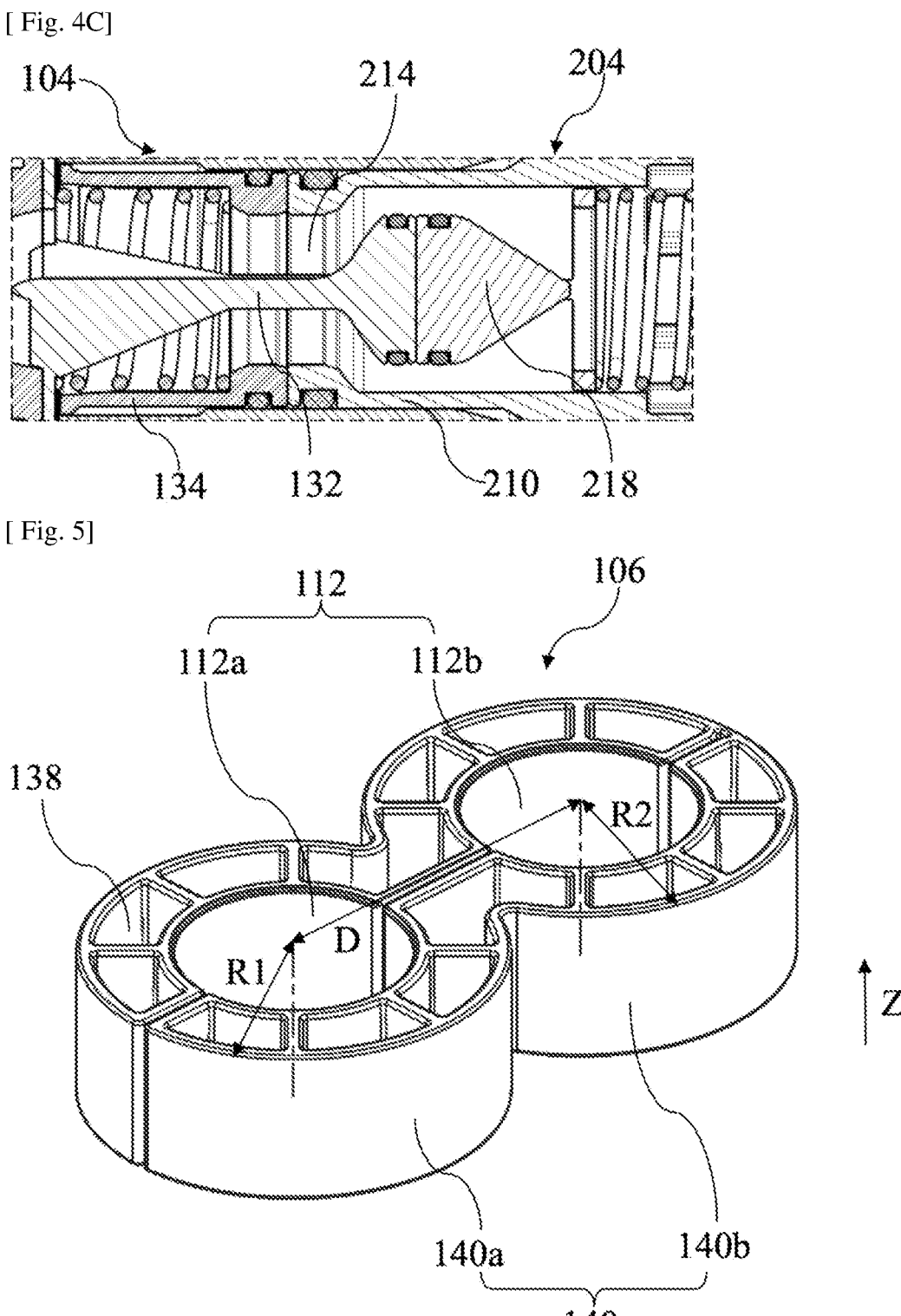
[ Fig. 5]

[ Fig. 6A]
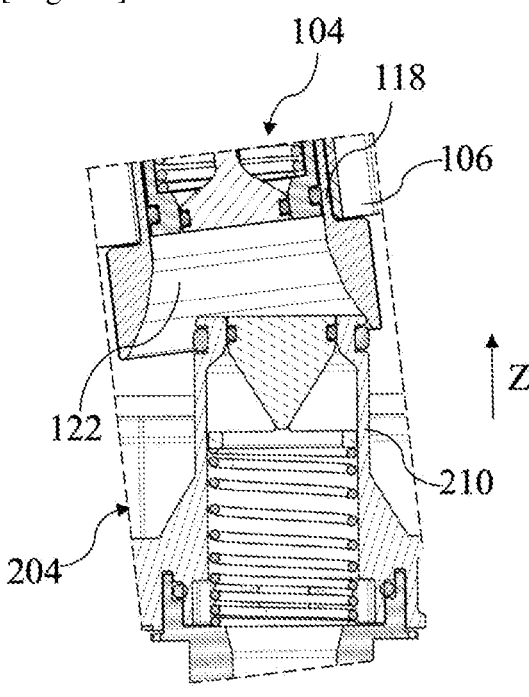
[ Fig. 6B]
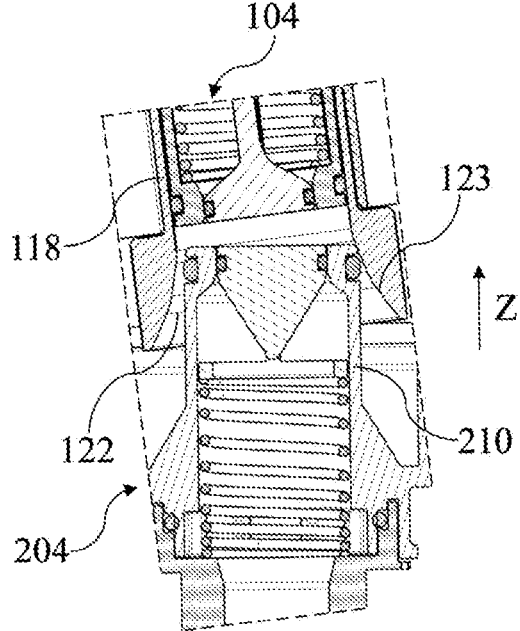

[ Fig. 6C]
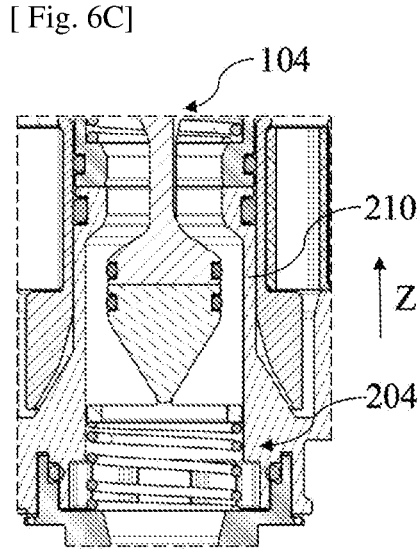
[ Fig. 7]
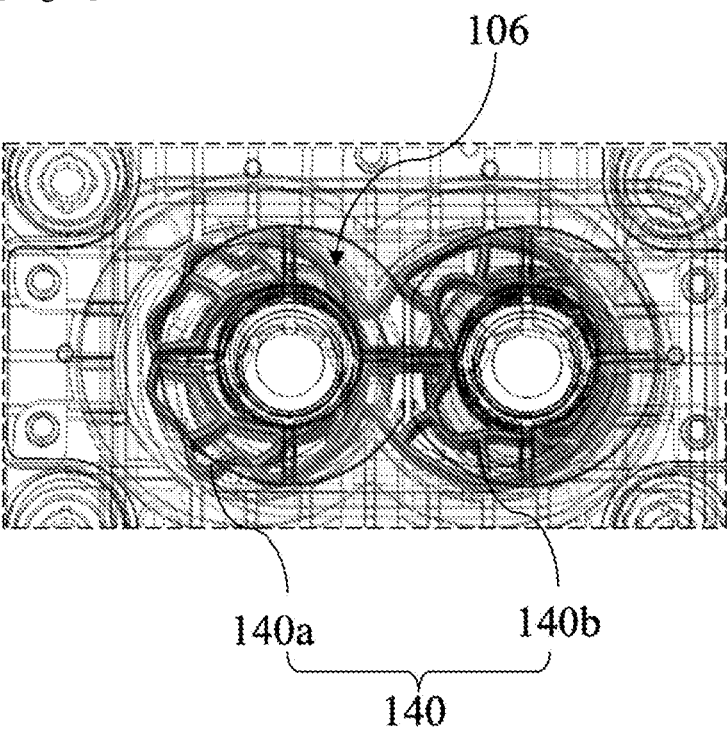

[ Fig. 8A FIG.8B FIG.8C]
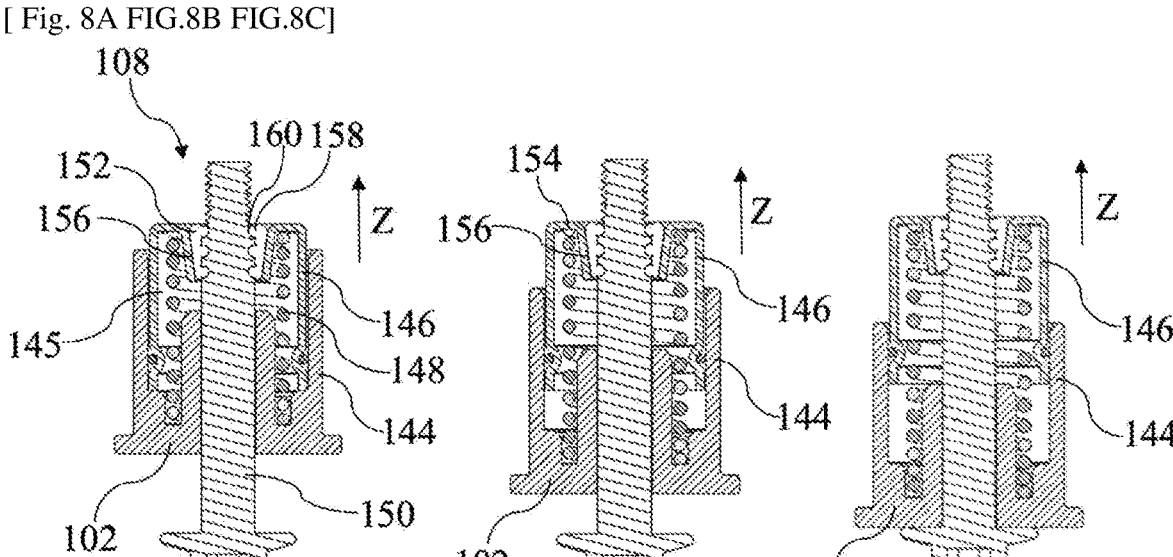
FIG. 8A                    FIG. 8B                    FIG. 8C
[ Fig. 9A]
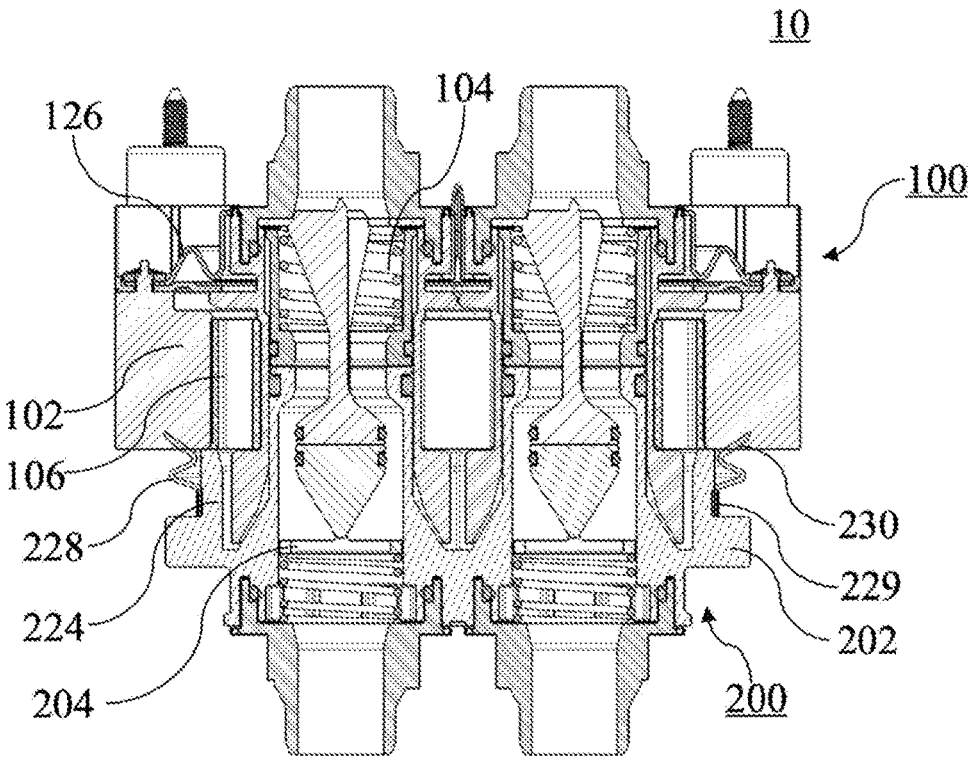

[ Fig. 9B]
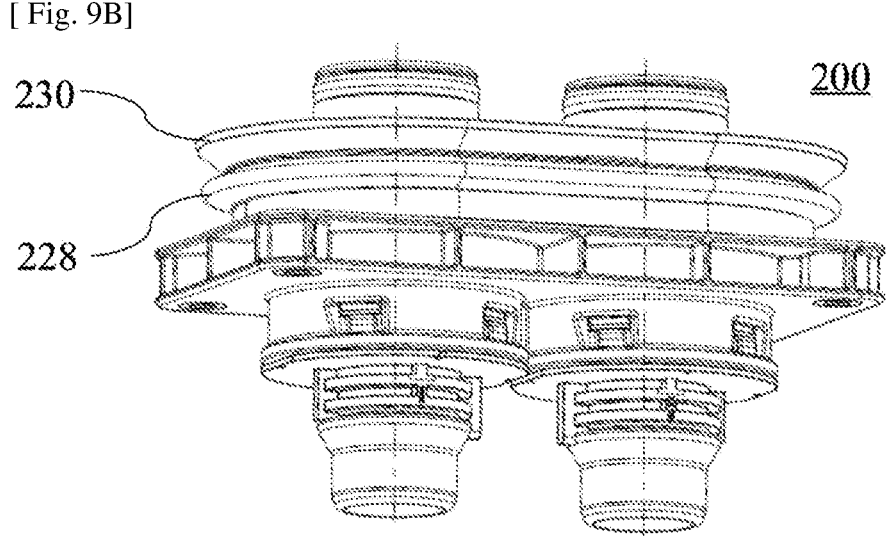
230
200
228

CONNECTOR DEVICE

CROSS-REFERENCE TO RELATED APPLICATIONS

This application is the U.S. National Stage of International Application No. PCT/CN2023/086617 filed on 6 Apr. 2023, which claims priority to and all advantages of Chinese Application No. 202210986786.3 filed on 17 Aug. 2022, the contents of which are incorporated herein by reference.

RELATED FIELD

The present disclosure generally relates to a connector device for establishing fluid communication between fluid pipelines.

BACKGROUND

A connector device can be used in various applications to establish connection and fluid communication between fluid pipelines.

The connector device generally includes a female connector and a male connector each of which is connected to a fluid pipeline. The male connector can be inserted into the female connector to establish fluid communication between the fluid pipelines. It is desirable that the female connector and the male connector can adapt to assembly deviations in various directions when the female connector and the male connector are connected, so that the female connector and the male connector can be easily assembled and connected to each other, which is particularly advantageous for application scenarios where the female connector and the male connector are required to be connected or disconnected frequently. For example, some electric vehicle manufacturers currently choose the battery-pack swapping technique in which the male and female connectors of the connector device, used to establish fluid communication between a thermal management system in a battery pack and a coolant supply system in a vehicle, are required to be connected or disconnected again and again. Therefore, it is desirable that the connector device can absorb assembly deviations in various directions during the swap of the battery pack. In addition, it is also desirable that the connector device applied to the vehicle can have a small weight to realize the lightweight of the vehicle.

At present, a utility model application CN216158545U provided a female connector and a connector assembly, where the connector assembly includes the female connector and a male connector for connecting with the female connector. The connector assembly can absorb installation tolerances through elastic deformation of a bushing which is sleeved outside the housing of the female connector and arranged in a receiving passage of a base. However, the female connector has no independent floating device to absorb the installation tolerances in the axial direction of the housing of the female connector. When a plug end of the male connector is inserted into the housing of the female connector, the valve structures of the female connector and the male connector might compensate for the installation tolerance in the axial direction of the housing of the female connector. The insertion depth of the plug end of the male connector is not fixed, which is prone to accelerate the wear of the valve structures, such as the wear of a sealing structure, and increase the risk of fluid leakage. Another utility model application CN213177219U disclosed a new type of self-sealing quick connector for water cooling pipelines. The quick connector includes a male connector, and the male connector includes a fixing plate, a tube connecting piece, a male connector body and adjusting assemblies having scroll spring and floating springs. The fixing plate is connected to a mounting surface through four adjusting assemblies, and the deviations of the fixing plate in three dimensions can be automatically corrected by means of the floating springs and the scroll springs. The male connector body of the male connector is rigidly connected with the fixing plate, and when the male connector body drives the fixing plate to move or tilt due to assembly deviations, the junction where the male connector body is connected to the fixing plate will have stress concentration. Therefore, this structure is not suitable for a male connector made of plastic; otherwise the male connector made of plastic will be damaged.

SUMMARY

An object of the present disclosure is to solve the above issues in the prior art, and to provide an improved connector device.

For the above object, a connector device is provided according to the present disclosure. The connector device includes a floating connector assembly and a mating connector assembly, where the floating connector assembly includes a base, a floating connector and a first floating unit. The base defines a base plane and includes an accommodating space for accommodating the first floating unit. The first floating unit includes a through hole for receiving the floating connector and is configured to allow the floating connector to move in a radial direction of the through hole and to tilt relative to an axial direction of the through hole. The mating connector assembly includes a mating connector suitable for being connected with the floating connector, where the floating connector includes a valve assembly, the mating connector includes a valve unit, and the valve assembly and the valve unit are such configured as to switch to an open state when the floating connector is connected with the mating connector, such that flow paths of the floating connector and the mating connector are both opened. The floating connector assembly further includes a second floating unit mounted to the base and configured to be movable relative to the base in a direction perpendicular to the base plane. The connector device is configured such that the second floating unit is movable to varied floating positions relative to the base after the valve assembly and the valve unit are both switched to the open state, so as to compensate for assembly deviations in the direction perpendicular to the base plane.

The first floating unit and the second floating unit of the floating connector assembly can absorb assembly deviations/tolerances in all directions. Moreover, the floating connector is arranged in the first floating unit in the base, which also helps to avoid the damage to the floating connector caused by the assembly deviations/tolerances when connecting the floating connector assembly with the mating connector assembly. This is particularly advantageous for a floating connector made of plastic. In addition, since an independent second floating unit is provided to absorb the assembly deviations in the direction perpendicular to the base plane and the second floating unit is configured to be moved to varied floating positions relative to the base after the valve assembly and the valve unit are both switched to the open state, it can prevent the valve assembly and the valve unit from compensating for the assembly deviations in the direction perpendicular to the base plane and reduce the wear of the valve assembly and the valve unit.

According to the above technical concept, the present disclosure may further include one or more of the following optional forms.

In some optional forms, the base includes a receiving cavity, and the second floating unit includes an enclosure and an elastic member. The enclosure is movable relative to the receiving cavity in a direction perpendicular to the base plane, and the enclosure and the receiving cavity together define a receiving space. The elastic member is arranged in the receiving space to bias the enclosure in a direction away from the base.

In some optional forms, the second floating unit further includes an externally threaded fastener and a fitting member, and the externally threaded fastener extends through the receiving space and is engaged with the fitting member to mount the enclosure to the base.

In some optional forms, the enclosure is provided with an inverted conical limiting hole, and the fitting member has an outer contour matching the shape of the limiting hole, where the fitting member is arrange around the externally threaded fastener in the limiting hole to be limited by the limiting hole.

In some optional forms, the fitting member is provided with a first fitting portion, the externally threaded fastener is provided with a second fitting portion matching the first fitting portion in shape, and the second fitting portion establishes a form-fit with the first fitting portion.

In some optional forms, the first floating unit is in the form of a bushing and is made of thermoplastic elastomer and/or rubber material, and at least one cavity is defined in a peripheral wall of the first floating unit.

In some optional forms, the floating connector assembly includes at least two floating connectors, and the first floating unit correspondingly includes at least two cylindrical portions. Each cylindrical portion defines the respective through hole for receiving the corresponding floating connector. The at least two cylindrical portions include a first cylindrical portion and a second cylindrical portion whose axes are parallel to each other, and the first cylindrical portion and the second cylindrical portion intersect.

In some optional forms, the mating connector assembly further includes a mounting seat, and the mating connector is connected to the mounting seat. The base or the mounting seat is provided with a stop portion configured to abut against the mounting seat or base opposite to the stop portion. In other words, one of the base and the mounting seat is provided with a stop portion which is suitable for abutting against the other of the base and the mounting seat. The stop portion is configured to limit/fix a plugging depth when the floating connector and the mating connector are plugged together.

In some optional forms, the base plane is perpendicular to the axial direction of the through hole.

In some optional forms, the floating connector assembly further includes a mounting plate and a flexible first protective cover. The mounting plate has an opening for the floating connector to pass through, the floating connector is held on the base by means of the mounting plate, and the first protective cover is arranged around the floating connector to cover a gap between the floating connector and an edge of the opening.

In some optional forms, the floating connector assembly further includes a flexible first protective cover, and the first protective cover is arranged around the floating connector to cover a gap between the floating connector and the base.

In some optional forms, the connector device further includes a second protective cover, and the second protective cover is arranged to cover a junction where the floating connector is connected to the mating connector.

The connector device according to the present disclosure can absorb the assembly deviations in all directions, reduce the damage caused by the assembly deviations to the floating connector and the mating connector, and prolong the service life of the connector device.

BRIEF DESCRIPTION OF THE DRAWINGS

Other features and advantages of the present disclosure will be readily understood through the following optional embodiments described in detail with reference to the accompanying drawings, in which the same reference numerals indicate the same or similar components.

FIG. 1 is a perspective view of a floating connector assembly of a connector device according to a first embodiment of the present disclosure;

FIG. 2 is a perspective view of a mating connector assembly of the connector device according to the first embodiment of the present disclosure;

FIG. 3 is a cross-sectional view of the connector device according to the first embodiment of the present disclosure, where the floating connector assembly and the mating connector assembly are connected with each other;

FIG. 4A is a partial cross-sectional view of the floating connector assembly of the connector device according to the first embodiment of the present disclosure, wherein a valve assembly of the floating connector assembly is in a closed state;

FIG. 4B is a partial cross-sectional view of the mating connector assembly of the connector device according to the first embodiment of the present disclosure, wherein a valve unit of the mating connector assembly is in a closed state;

FIG. 4C is a partial cross-sectional view of the connector device according to the first embodiment of the present disclosure, where the floating connector assembly and the mating connector assembly are connected with each other, and the valve unit and the valve assembly are both in an open state;

FIG. 5 is a perspective view of a first floating unit of the floating connector assembly of the connector device according to the first embodiment of the present disclosure;

FIG. 6A to FIG. 6C respectively show partial cross-sectional views of the connector device, according to the first embodiment of the present disclosure, at different stages of connecting the floating connector assembly with the mating connector assembly with axes thereof being misaligned;

FIG. 7 is a deformation simulation diagram of the first floating unit of the connector device, according to the first embodiment of the present disclosure, in the process of connecting the floating connector assembly with the mating connector assembly with axes thereof being misaligned;

FIG. 8A to FIG. 8C respectively show partial cross-sectional views of the floating connector assembly of the connector device according to the first embodiment of the present disclosure, where the second floating unit is in varied floating positions;

FIG. 9A is a cross-sectional view of the connector device according to a second embodiment of the present disclosure; and FIG. 9B is a perspective view of the mating connector assembly of the connector device according to the second embodiment of the present disclosure.

DETAILED DESCRIPTION

The implementation and usage of the embodiments are discussed in detail below. However, it is conceivable that the specific embodiments discussed are merely intended to illustrate specific ways of implementing and using the present disclosure, and are not intended to limit the scope of the present disclosure. When describing structures and positions of components, the orientation-related expressions herein, such as "upper", "lower", "top", and "bottom", are not absolute, but relative. When the components are arranged as shown in the drawings, these orientation-related expressions are appropriate, but when the positions of these components in the drawings are altered, these orientation-related expressions should be altered accordingly.

In the present disclosure, the axial direction of a cylindrical or tubular component refers to the direction along the central axis of the component, the peripheral direction of the cylindrical or tubular component refers to the direction along the circumference/perimeter of the component, and the radial direction of the cylindrical or tubular component refers to the direction passing through the central axis of the component and perpendicular to the axial direction of the component.

FIG. 1 to FIG. 3 show a connector device 10 according to a first exemplary embodiment of the present disclosure. The connector device 10 includes a floating connector assembly 100 and a mating connector assembly 200 for being connected with the floating connector assembly 100. The floating connector assembly 100 and the mating connector assembly 200 may each be connected with a fluid pipeline (not shown). The connector device 10 will be described below, taking the application of the connector device 10 for establishing fluid communication between a thermal management system in a battery pack and a coolant supply system in a vehicle as an example.

Referring to FIGS. 1-3 and FIG. 5, the floating connector assembly 100 includes a base 102, a floating connector 104, a first floating unit 106, and a second floating unit 108. The base 102 defines a base plane and includes an accommodating space 110 for accommodating the first floating unit 106. The first floating unit 106 includes a through hole 112 for receiving the floating connector 104 and is configured to allow the floating connector 104 to move in a radial direction of the through hole 112 and to tilt relative to an axial direction of the through hole 112. The second floating unit 108 is mounted to the base 102 and is configured to be movable relative to the base 102 in a direction perpendicular to the base plane. The floating connector assembly 100 may be mounted to the vehicle body via the second floating unit 108. The floating connector 104 may include a floating connector body 114 and a valve assembly 116 arranged in the floating connector body 114, and is in fluid connection with the fluid pipeline in the coolant supply system of the vehicle.

The mating connector assembly 200 may include a mounting seat 202 and a mating connector 204. The mounting seat 202 may be mounted to a casing of the battery pack. The mating connector 204 may include a mating connector body 206 and a valve unit 208 arranged in the mating connector body 206, and the mating connector 204 may be in fluid connection with the fluid pipeline in the thermal management system of the battery pack.

The floating connector 104 and the mating connector 204 can be connected with each other/or plugged together to achieve the fluid communication between the coolant supply system of the vehicle and the thermal management system in the battery pack. In the illustrated embodiment, the mating connector body 206 of the mating connector 204 has a plug-in portion 210, where the plug-in portion 210 can be inserted into the floating connector body 114 of the floating connector 104 to realize the connection between the floating connector 104 and the mating connector 204. It is conceivable that the floating connector 104 and the mating connector 204 may also be configured to allow the floating connector 104 to be inserted into the mating connector 204, thereby realizing the connection between the floating connector 104 and the mating connector 204.

In the illustrated embodiment, during the swap of the battery pack (specifically, during the process of connecting the floating connector assembly 100 on the vehicle body with the mating connector assembly 200 on the battery pack and fixing the battery pack to the vehicle body), the first floating unit 106 and the second floating unit 108 of the floating connector assembly 100 can absorb assembly deviations in all directions. Moreover, the floating connector 104 is arranged in the first floating unit 106 in the base 102, which also helps to avoid the damage to the floating connector 104 caused by the assembly deviations during the process of connecting the floating connector 104 with the mating connector 204. This is particularly advantageous for a floating connector made of plastic. This will be described in detail in the following.

Referring to FIG. 1, in the illustrated embodiment, the base 102 of the floating connector assembly 100 is substantially plate-shaped. With the XYZ rectangular coordinate system in FIG. 1 as a reference, the base plane defined by the base 102 is the XY plane of the base 102, that is, the plane in which the length direction X and the width direction Y of the base 102 lie. When the floating connector assembly 100 is mounted onto the vehicle body, the base plane is substantially parallel to a mounting surface on the vehicle body for the floating connector assembly 100.

Referring to FIG. 3, the base 102 includes an accommodating space 110 that runs through the base 102 along a direction perpendicular to the base plane (that is, along the thickness direction Z of the base 102) for accommodating the first floating unit 106. In the illustrated embodiment, the axial direction of the through hole 112 of the first floating unit 106 is perpendicular to the base plane, that is, the axial direction of the through hole 112 is along the Z direction. The through hole 112 of the first floating unit 106 receives at least part of the floating connector 104.

Referring to FIG. 1 and FIG. 3, the floating connector body 114 of the floating connector 104 defines a flow path of the floating connector 104, and includes a first section 118 and a second section 120. In the illustrated embodiment, the first section 118 and the second section 120 are formed separately and assembled together by snap fit. This allows the second section 120 to have various configurations to adapt to different pipelines, counterparts, or quick connectors, expanding the application range of the floating connector assembly 100. The first section 118 and the second section 120 may be formed by, for example, injection molding. In the illustrated embodiment, the first section 118 and the second section 120 are assembled to form a roughly 90° elbow, which is particularly advantageous for the application in a limited mounting space. It is conceivable that in other embodiments the first section 118 and the second section 120 may also be assembled to form an elbow with any required angle such as 45°, 135° or the like, or to form a straight tube.

The first section 118 is substantially tubular. The first section 118 is coaxially arranged in the through hole 112, so the axial direction of the first section 118 is also along the Z direction. An inlet 122, for insertion of the plug-in portion 210 of the mating connector 204, is provided at an end of the first section 118. The inlet 122 includes a guide surface 123 to guide the plug-in portion 210 of the mating connector 204 to be inserted into the first section 118.

In the illustrated embodiment, the first section 118 includes a first flange 124 and a second flange 126 arranged on the outside thereof. Both the first flange 124 and the second flange 126 are substantially annular. The first flange 124 and the second flange 126 are spaced apart from each other in the axial direction of the first section 118, and are respectively located on opposite sides of the first floating unit 106. The outer diameters of the first flange 124 and the second flange 126 are both larger than the diameter of the through hole 112 of the first floating unit 106, so as to prevent the floating connector 104 from escaping from the through hole 112 of the first floating unit 106. The outer diameter of the part of the first section 118 received by the through hole 112 is basically equal to the diameter of the through hole 112, so that the first section 118 can be relatively stably retained in the through hole 112 of the first floating unit 106.

Further referring to FIG. 3, the floating connector body 114 can be retained on the base 102 by means of the mounting plate 128. The mounting plate 128 has an opening 129 through which the floating connector body 114 is directed. In the illustrated embodiment, the mounting plate 128 is fixed to the base 102 so that the first flange 124 of the first section 118 is limited between the base 102 and the mounting plate 128 in the Z direction, thus preventing the floating connector body 114 from escaping from the base 102. The base 102 and the mounting plate 128 define a movement space 130 therebetween for the first flange 124 to move therein. The movement space 130 and the accommodating space 110 are in communication with each other. When the floating connector 104 moves relative to the base 102 along the radial direction of the through hole 112 of the first floating unit 106 (that is, moves along the XY plane) or tilts relative to the axial direction of the through hole 112 of the first floating unit 106 (that is, tilts relative to the Z direction), the first flange 124 will translate, tilt, and/or rotate within the movement space 130.

Referring to FIG. 4A and FIG. 4C, in the illustrated embodiment, the valve assembly 116 of the floating connector 104 is a check valve, and includes a valve stem 132, a sliding sleeve 134, an elastic element 136, a first sealing element 131, and a second sealing element 133. The valve stem 132 is arranged in the first section 118 along the axial direction of the first section 118. The valve stem 132 includes a valve stem head 135 and a valve stem base 137. The sliding sleeve 134 is located in the first section 118 and is sleeved outside the valve stem 132, and is slidable between a closed position (shown in FIG. 4A) and an open position (shown in FIG. 4C) along the axial direction of the first section 118, so that the valve assembly 116 is accordingly switched between the closed state (shown in FIG. 4A) and the open state (shown in FIG. 4C). The sliding sleeve 134 is biased towards the closed position by the elastic force of the elastic element 136. In the illustrated embodiment, the elastic element 136 is a coil spring, and two ends of the elastic element 136 abut against the sliding sleeve 134 and the valve stem base 137 respectively. The first sealing element 131 is embedded in the outer periphery of the valve stem head 135, so as to sealingly contact with the inner peripheral surface of the sliding sleeve 134. The second sealing element 133 is embedded in the outer periphery of the sliding sleeve 134, so as to sealingly contact with the inner peripheral surface of the first section 118. As shown in FIG. 4A, the sliding sleeve 134 blocks the annular gap between the first section 118 and the valve stem head 135 to close the flow path of the floating connector 104, when the sliding sleeve 134 is biased by the elastic element 136 to be in the closed position. As shown in FIG. 4C, when the sliding sleeve 134 is pushed by an external force along the axial direction of the first section 118, the sliding sleeve 134 can be moved to the open position against the elastic force of the elastic element 136, so that the flow path of the floating connector 104 is opened.

Referring to FIG. 3 and FIG. 5, in the illustrated embodiment, the first floating unit 106 is in the form of a bushing, and may be made of thermoplastic elastomer and/or rubber material. In an embodiment, the first floating unit 106 is made of TPV. At least one cavity 138 is defined in a peripheral wall of the first floating unit 106. The combination of the material and cavity structure of the first floating unit 106 allows the first floating unit 106 to be elastically deformed when subjected to an external force. In this way, the first floating unit 106 allows the floating connector 104 to move relative to the base 102 in the radial direction of the through hole 112 of the first floating unit 106 or tilt relative to the axial direction of the through hole 112 of the first floating unit 106. In other words, the floating connector 104 is allowed to move relative to the base 102 along the base plane (that is, float along the XY plane) and to tilt relative to the direction perpendicular to the base plane (that is, tilt relative to the Z direction), so as to adapt to the assembly deviations during the process of connecting the floating connector 104 with the mating connector 204.

This is particularly advantageous for the case in which the first section 118 of the floating connector 104 and the plug-in portion 210 of the mating connector 204 are not axially aligned (for example, the axis of the first section 118 of the floating connector 104 and the axis of the plug-in portion 210 of the mating connector 204 deviate from each other by a certain distance or form a certain angle) when connecting the floating connector 104 with the mating connector 204. Herein, unless otherwise stated, the radial and axial directions of the through hole 112 of the first floating unit 106 refer to the radial and axial directions of the through hole 112 when the first floating unit 106 is in the original state. For the illustrated embodiment, the radial and axial directions of the through hole 112 of the first floating unit 106 refer to the radial and axial directions of the through hole 112 when the first floating unit 106 is not deformed.

In addition, when the floating connector 104 moves relative to the base 102 along the XY plane and tilts relative to the Z direction, the floating connector 104 will further be cushioned by the first floating unit 106. Compared with the case in which the floating connector is rigidly connected with the base, the structure of the floating connector 104 being provided in the first floating unit 106 in the present disclosure is helpful to avoid damage when the floating connector 104 floats, especially when the floating connector 104 moves along the XY plane/tilts relative to the Z direction. This structure in turn allows the floating connector 104 (especially the floating connector body 114 of the floating connector 104) to be made of, for example, plastic material, so as to achieve lightweight of the connector device 10 and reduce the manufacturing cost of the connector device 10.

FIGS. 6A to 6C show the process of connecting the floating connector 104 with the mating connector 204/plugging the mating connector 204 into the floating connector 104 when the inlet 122 of the first section 118 of the floating connector 104 is not axially aligned with the plug-in portion 210 of the mating connector 204. Referring to FIGS. 6A to 6C, as shown in FIG. 6A, since the inlet 122 of the first section 118 of the floating connector 104 is not axially aligned with the plug-in portion 210 of the mating connector 204, the plug-in portion 210 of the mating connector 204 first pushes the first section 118 when being inserted into the inlet 122 of the first section 118. At this time, the first floating unit 106 accommodating the first section 118 is elastically deformed to allow the first section 118 to be tilted relative to the Z direction, so that the plug-in portion 210 can be more easily inserted into the first section 118 through the inlet 122. Then, as shown in FIG. 6B, the plug-in portion 210 can be further inserted into the first section 118 under the guidance by the guide surface 123 of the inlet 122. At last, as shown in FIG. 6C, the plug-in portion 210 of the mating connector 204 is inserted in place, realizing the connection of the floating connector 104 and the mating connector 204.

Referring to FIGS. 3 and 5, in the illustrated embodiment, the floating connector assembly 100 has two floating connectors 104, the first floating unit 106 accordingly has two through holes 112a and 112b (which are collectively referred to as through holes 112 herein) for receiving the floating connectors 104, and the mating connector assembly 200 accordingly has two mating connectors 204.

It is conceivable that the floating connector assembly 100 may also have one or more than two floating connectors 104, the first floating unit 106 may have a corresponding number of through holes 112, and the mating connector assembly 200 may also have a corresponding number of mating connectors 204.

Referring to FIG. 5, in the illustrated embodiment, the first floating unit 106 includes a first cylindrical portion 140a and a second cylindrical portion 140b (which are collectively referred to as the cylindrical portions 140 herein), the first cylindrical portion 140a defines the through hole 112a, and the second cylindrical portion 140b defines the through hole 112b. In the illustrated embodiment, each cylindrical portion 140 has multiple cavities 138 arranged along the circumference of the cylindrical portion and extending in the axial direction of the cylindrical portion to facilitate elastic deformation of the first floating unit 106. It is conceivable that the first floating unit 106 may also have other suitable multi-cavity configuration. For example, the peripheral wall of the cylindrical portion 140 may be honeycomb-shaped.

In the illustrated embodiment, the axes of the through hole 112a of the first cylindrical portion 140a and the through hole 112b of the second cylindrical portion 140b are parallel to each other and both perpendicular to the base plane, that is, both along the Z direction. The first cylindrical portion 140a and the second cylindrical portion 140b intersect. In other words, the distance D between the axis of the first cylindrical portion 140a and the axis of the second cylindrical portion 140b is less than the sum of the outer diameter R1 of the first cylindrical portion 140a and the outer diameter R2 of the second cylindrical portion 140b. With such configuration, as shown in FIG. 7, if the floating connector 104 needs to move relative to the base 102 along the XY plane and to tilt relative to the Z direction when connecting the floating connector 104 with the mating connector 204, the first cylindrical portion 140a and the second cylindrical portion 140b will be coordinately deformed and the consistency of the deformation can be enhanced, thereby reducing the force required to deform the first floating unit 106 and thus reducing the insertion force required to complete the proper connection of the floating connector 104 with the mating connector 204. In the illustrated embodiment, the first cylindrical portion 140a and the second cylindrical portion 140b are symmetrically arranged.

Referring to FIGS. 8A to 8C, the base 102 further includes a receiving cavity 144. The second floating unit 108 includes an enclosure 146 and an elastic member 148. The enclosure 146 is configured to be movable relative to the receiving cavity 144 in a direction perpendicular to the base plane, that is, be movable along the Z direction. The enclosure 146 and the receiving cavity 144 together define a receiving space 145, and the elastic member 148 is arranged in the receiving space 145 to bias the enclosure 146 in a direction away from the base 102.

In the illustrated embodiment, the enclosure 146 has a substantially cylindrical shape and is at least partially arranged in the receiving cavity 144, and the receiving cavity 144 has a substantially cylindrical shape matching the shape of the enclosure 146 to guide the enclosure 146 to move along the Z direction along the inner peripheral surface of the receiving cavity 144. It can be understood that, in other embodiments, the enclosure 146 may also be sleeved outside the receiving cavity 144 to move along the Z direction along the outer peripheral surface of the receiving cavity 144. In the illustrated embodiment, the elastic member 148 is a coil spring. It can be understood that, in other embodiments the elastic member 148 may also be other components capable of applying a Z-direction bias force to the enclosure 146.

The second floating unit 108 further includes an externally threaded fastener 150 and a fitting member 152. The externally threaded fastener 150 can extend through the receiving space 145 and engage with the fitting member 152 for movably mounting the enclosure 146 to the base 102. The externally threaded fastener 150 may be a screw bolt or a screw stud. In the illustrated embodiment, the externally threaded fastener 150 extends through the elastic member 148 in the receiving space 145.

An end wall 154 of the enclosure 146 is provided with an inverted conical limiting hole 156 which tapers toward the base 102. The fitting member 152 has an inverted conical outer contour matching the shape of the limiting hole 156. The fitting member 152 is arranged around the externally threaded fastener 150 in the limiting hole 156 to be limited by the limiting hole 156. Since the enclosure 146 is subjected to the elastic force of the elastic member 148, the fitting member 152 has a downward movement tendency relative to the limiting hole 156 of the enclosure 146. The relative movement tendency of the fitting member 152 and the limiting function of the limiting hole 156 jointly act to firmly hold the fitting member 152 in the limiting hole 156 to prevent the fitting member 152 from loosening.

In the illustrated embodiment, the fitting member 152 is provided with a first fitting portion 158, the externally threaded fastener 150 is provided with a second fitting portion 160 matching the first fitting portion 158 in shape, and the second fitting portion 160 establishes a form-fit with the first fitting portion 158. In the illustrated embodiment, the first fitting portion 158 is in the form of a protrusion, and the second fitting portion 160 is in the form of a recess. It can be understood that, in other embodiments the first fitting portion 158 may be in the form of a recess, while the second fitting portion 160 is in the form of a protrusion. It can be understood that, in other embodiments the fitting member 152 may have internal threads and be in thread engagement with the externally threaded fastener 150.

In the illustrated embodiment, the fitting member 152 as a whole is in a cone shape. Optionally, the fitting member 152 may include two separately formed segments which have the same semi-cone shape to jointly form the conical fitting member 152, which can facilitate the installation of the fitting member 152. Specifically, while installing the fitting member 152, the enclosure 146 is pressed downward to expose the second fitting portion 160 of the externally threaded fastener 150, then the two segments of the fitting member 152 are engaged with the externally threaded fastener 150, and finally the pressure on the enclosure 146 is removed, and the enclosure 146 moves upward under the elastic force of the elastic member 148 until the fitting member 152 is received and limited in the limiting hole 156. It can be understood that, in other embodiments the fitting member 152 may also be formed by peripheral combination of more than two segments.

Referring to FIGS. 8A to 8C, the floating connector assembly 100 can be mounted to the vehicle body via the externally threaded fastener 150 of the second floating unit 108. When the floating connector assembly 100 is mounted to the vehicle body, the end wall 154 of the enclosure 146 of the second floating unit 108 abuts against the vehicle body. In this way, especially in the process of fixing the battery pack to the vehicle body after the mating connector assembly 200 on the battery pack is connected with/plugged into the floating connector assembly 100 on the vehicle body, the floating connector assembly 100 may be pushed by the mating connector assembly 200, so that the base 102 can be moved relative to the enclosure 146/vehicle body along the direction perpendicular to the base plane (along Z-direction), thereby absorbing Z-direction assembly deviations. As shown in FIGS. 8A to 8C, the base 102 can be moved to varied positions relative to the enclosure 146 in the Z direction. In other words, the second floating unit 108 can be moved to varied floating positions to absorb/compensate for the Z-direction assembly deviations within a certain range.

Referring to FIGS. 1 and 3 again, the floating connector assembly 100 further includes a flexible first protective cover 162. The first protective cover 162 is arranged around the floating connector 104 to cover at least the gap between the floating connector 104 and the edge of the opening 129 of the mounting plate 128, so as to prevent foreign matters from entering the movement space 130, the accommodating space 110, the cavity 138 of the first floating unit 106, and the floating connector 104 and so on. When the floating connector 104 is moved relative to the base 102, the first protective cover 162 can deform due to/following the movement of the floating connector 104 and prevent the intrusion of foreign matters (such as dust and water). In the illustrated embodiment, the first protective cover 162 may have a corrugated cross-section so that the first protective cover 162 can more easily deform following the movement of the floating connector 104.

In the illustrated embodiment, the first protective cover 162 is provided with an orifice 164 for the floating connector 104 to pass through. The first protective cover 162 may be sealingly connected with the floating connector 104 at the orifice 164 by, for example, bonding, laser welding, high-frequency welding, or overmolding. An outer edge of the first protective cover 162 may be fixed to the base 102 by a press ring 166. In the illustrated embodiment, the base 102 includes a projection 168. The projection 168 extends substantially perpendicular to the base plane, that is, extends along the Z direction, and extends through the mounting plate 128, the outer edge of the first protective cover 162, and the press ring 166. A free end of the projection 168 is engaged with a spring nut 170 (see FIG. 1) to clamp the outer edge of the first protective cover 162 between the press ring 166 and the mounting plate 128 fixed to the base 102, so that the outer edge of the first protective cover 162 is fixed to the base 102.

It can be understood that the first protective cover 162 may also be arranged around the floating connector 104 to cover the gap between the floating connector 104 and the base 102 to prevent entrance of foreign matters, for example, if the floating connector assembly 100 is dispensed with mounting plate.

Referring to FIG. 2, FIG. 3, and FIG. 4B, the mounting seat 202 of the mating connector assembly 200 is substantially plate-shaped. The mounting seat 202 includes fastening holes 203 through which fasteners may pass through to secure the mounting seat 202 to the casing of the battery pack. The mating connector body 206 of the mating connector 204 of the mating connector assembly 200 defines the flow path of the mating connector 204. The mating connector body 206 includes the plug-in portion 210 and an adapter portion 212.

The plug-in portion 210 is substantially tubular and extends substantially perpendicular to the mounting seat 202. A port 214 is provided at an end of the plug-in portion 210. The plug-in portion 210 can be inserted into the floating connector 104 through the inlet 122 of the floating connector 104. A first sealing member 215 (see FIG. 4B) for sealingly contacting with the inner peripheral surface of the first section 118 of the floating connector 104, is embedded in the outer periphery of the plug-in portion 210. Multiple guide ribs 216 (see FIG. 2) are further arranged on the outside of the plug-in portion 210. The guide ribs 216 can cooperate with the guide surface 123 of the floating connector 104 to facilitate the alignment of the plug-in portion 210 of the mating connector 204 with the first section 118 of the floating connector 104. In the illustrated embodiment, the multiple guide ribs 216 are radially arranged around plug-in portion 210.

In the illustrated embodiment, the plug-in portion 210 is integrally formed with the mounting seat 202. It can be understood that, in other embodiments the plug-in portion 210 may be fixed to the mounting seat 202 by other means. The adapter portion 212 may be fixed to the plug-in portion 210 by, for example, snap fit. The adapter portion 212 may have different configurations to adapt to different pipelines or counterparts, expanding the application range of the mating connector assembly 200.

Referring to FIG. 4B and FIG. 4C, the valve unit 208 is a check valve, and includes a valve core 218, an elastic component 220, and a second sealing member 222. The valve core 218 is movable between the closed position (see FIG. 4B) and the open position (see FIG. 4C) along the axial direction of the plug-in portion 210, so that the valve unit 208 can be accordingly switched between the closed state (see FIG. 4B) and the open state (see FIG. 4C). The valve core 218 is biased toward the closed position by the elastic component 220. In the illustrated embodiment, the elastic component 220 is a coil spring. The second sealing member 222 is embedded in the outer periphery of the valve core 218. As shown in FIG. 4B, when the valve core 218 is biased by the elastic component 220 to be in the closed position, the valve core 218 blocks/seals the port 214, so that the flow path of the mating connector 204 is closed. As shown in FIG.

4C, when the valve core 218 is pushed by an external force along the axial direction of the plug-in portion 210, the valve core 218 can be moved away from the port 214 to the open position against the elastic force of the elastic component 220, so that the flow path of the mating connector 204 is opened.

Referring to FIGS. 4A to 4C, while connecting the floating connector 104 with the mating connector 204, the plug-in portion 210 of the mating connector 204 is inserted/plugged into the floating connector 104 and pushes the sliding sleeve 134 of the floating connector 104 toward the open position from the closed position, and the valve stem 132 of the floating connector 104 pushes the valve core 218 of the mating connector 204 toward the open position from the closed position. When both the sliding sleeve 134 and the valve core 218 reach the open position, the connection of the floating connector 104 with the mating connector 204 is completed, and both the valve assembly 116 of the floating connector 104 and the valve unit 208 of the mating connector 204 are in the final open state, so that the flow path of the floating connector 104 and the flow path of the mating connector 204 are both opened and in fluid communication with each other, thus establishing fluid communication between the pipelines respectively connected to the floating connector 104 and the mating connector 204. When the mating connector 204 is disconnected from the floating connector 104 by pulling out the plug-in portion 210 of the mating connector 204 from the floating connector 104, the sliding sleeve 134 of the floating connector 104 and the valve core 218 of the mating connector 204 respectively return to the closed position, and at this time, the flow paths of the floating connector 104 and the mating connector 204 are both closed, and the fluid in the fluid pipelines respectively connected to the floating connector 104 and the mating connector 204 will not leak.

It can be understood that the structures of the valve assembly 116 of the floating connector 104 and the valve unit 208 of the mating connector 204 are only exemplary, and any other suitable check valve structure may also be used to realize the bidirectional cut-off function of the connector device 10.

Referring to FIGS. 2, 3, and 8A-8C, the connector device 10 is configured such that the second floating unit 108 is movable to varied floating positions relative to the base 102 after the valve assembly 116 and the valve unit 208 are both switched to the open state, so as to adapt to/absorb/compensate for assembly deviations in the direction perpendicular to the base plane (that is, Z-direction assembly deviations), especially the Z-direction assembly deviations generated while securing the battery pack to the vehicle body via fasteners. In other words, while connecting the floating connector 104 with the mating connector 204, the elastic element 136 of the valve assembly 116 and the elastic component 220 of the valve unit 208 are first compressed, so that the valve assembly 116 and the valve unit 208 are switched to the open state. Then, the elastic member 148 of the second floating unit 108 is compressed so that the enclosure 146 of the second floating unit 108 is moved to varied floating positions relative to the base 102. This can be achieved by, for example, configuring the elastic member 148 of the second floating unit 108 to have a larger elastic coefficient than the elastic element 136 of the valve assembly 116 and the elastic component 220 of the valve unit 208. By providing independent second floating unit 108, which is movable to varied floating positions relative to the base 102 after the valve assembly 116 and the valve unit 208 are both switched to the open state, the valve assembly 116 and the valve unit 208 can be prevented from compensating for the Z-direction assembly errors, reducing the wear of the valve assembly 116 and the valve unit 208 and prolonging the service life of the connector device 10.

Referring to FIG. 2 and FIG. 3, the mounting seat 202 of the mating connector assembly 200 is further provided with a stop portion 224. The stop portion 224 can abut against the base 102 of the floating connector assembly 100 when the plug-in portion 210 of the mating connector 204 is inserted into the floating connector 104, to fix the insertion depth of the plug-in portion 210. Due to the provision of the stop portion 224, the stop portion 224 of the mating connector assembly 200 will abut against the base 102 of the floating connector assembly 100 when the plug-in portion 210 is inserted to a preset position, and then the Z-direction assembly deviations in the insertion process will be absorbed by the second floating unit 108 of the floating connector assembly 100, which prevents the valve assembly 116 of the floating connector 104 and/or the valve unit 208 of the mating connector 204 from compensating for or absorbing the Z-direction assembly deviations, and prolongs the service life of the valve assembly 116 and the valve unit 208. It is worth noting that, thanks to the stop portion 224, during the process of connecting the floating connector 104 with the mating connector 204, and especially during the process of compensating for the Z-direction assembly deviations/errors when fixing the battery pack onto the vehicle body, the root of the plug-in portion 210 of the mating connector 204 will not push/force the first flange 124 against the mounting plate 128 by directly pushing the inlet 122 of the floating connector 104, avoiding increasing the stress on the mounting plate 128. Thus, the provision of the stop portion 224 can avoid fatigue fracture of the mounting plate 128, after the battery pack of the vehicle has been replaced for many times, in other words, after the plug-in portion 210 of the mating connector 204 has been repeatedly plugged and unplugged, thereby avoiding reducing the cycle life of the connector device 10.

It can be understood that, alternatively, the stop portion may also be arranged on the base 102 of the floating connector assembly 100 to abut against the mounting seat 202 of the mating connector assembly 200, so as to control the insertion depth of the plug-in portion 210.

Referring to FIG. 2, the stop portion 224 protrudes from the mounting seat 202 and surrounds the plug-in portion 210. In the illustrated embodiment, the stop portion 224 is in the form of a boss to increase the contact surface with the base 102 of the floating connector assembly 100 and ensure a stable contact. In the illustrated embodiment, the mating connector assembly 200 includes two mating connectors 204. Accordingly, the stop portion 224 may include two stop sections 226. In the illustrated embodiment, each stop section 226 surrounds the entire circumference of the plug-in portion 210 of the corresponding mating connector 204. It can be understood that the stop portion 224 may also have other configurations. For example, the respective stop section 226 of the stop portion 224 may be provided only on one side of the corresponding plug-in portion 210 rather than surrounding the entire circumference of the corresponding plug-in portion.

Referring to FIG. 3, the assembly of the connector device 10 during the swap of the vehicle battery pack will be briefly introduced in the following. When the vehicle battery pack is replaced, the mating connector 204 on the battery pack is preliminarily aligned with the floating connector 104 on the vehicle body, and then the plug-in portion 210 of the mating connector 204 is inserted into the floating connector body 114 of the floating connector 104 through the inlet 122 of the floating connector 104. After the connection of the floating connector 104 with the mating connector 204 is completed, fluid communication will be established between the thermal management system in the battery pack and the coolant supply system in the vehicle. Then, the battery pack can be further fixed to the vehicle body via fasteners, so that the floating connector assembly 100 and the mating connector assembly 200 are fixed to each other. During the swap of the battery pack, the first floating unit 106 and the second floating unit 108 can absorb assembly deviations in all directions.

It can be understood that when the connector device 10 is applied to the swapping scenarios of the vehicle battery pack, the floating connector assembly 100 may also be fixed/mounted to the casing of the battery pack, while the mating connector assembly 200 may be fixed/mounted to the vehicle body. In addition, it can be understood that the connector device 10 according to the present disclosure not only can be applied to the above scenario, but also can be applied to various scenarios where fluid communication needs to be established.

FIGS. 9A to 9B show another connector device 10 according to a second exemplary embodiment of the present disclosure. The connector device 10 according to the second exemplary embodiment is similar to the connector device according to the first exemplary embodiment of the present disclosure, and the difference is that the connector device 10 according to the second exemplary embodiment further includes a flexible second protective cover 228 in addition to the flexible first protective cover 126. The second protective cover 228 is arranged to cover/surround the junction/interface where the floating connector 104 is connected with the mating connector 204 after the floating connector 104 is connected with the mating connector 204, so as to prevent foreign matters from entering the cavity of the first floating unit 106, the floating connector 104 and the mating connector 204.

In the illustrated embodiment, the second protective cover 228 is arranged around the stop portion 224 and has a bellow structure. One end 229 of the second protective cover 228 is sealingly fixed to the outer periphery of the stop portion 224. Another end/free end 230 of the second protective cover 228 can abut against the base 102 of the floating connector assembly 100 after the floating connector 104 is connected with the mating connector 204 to prevent foreign matters from entering. It can be understood that, in other embodiments, one end of the second protective cover may also be fixed to the base 102 of the floating connector assembly 100, and another end of the second protective cover may abut against the mounting seat 202 of the mating connector assembly 200.

It should also be understood that the various components and features described herein can be made of a variety of materials, including, but not limited to, polymer, rubber, metal and other suitable materials or combinations of materials familiar to those skilled in the art. The embodiments shown in FIGS. 1 to 9B only illustrate the shape, size and arrangement of each optional component of the connector device according to the present disclosure. However, these embodiments are merely intended to illustrate, rather than limit. Other shapes, sizes and arrangements may be adopted without departing from the idea and scope of the present disclosure.

The technical contents and technical features of the present disclosure have been disclosed above. However, it can be understood that, those skilled in the art can make various changes and improvements to the above-disclosed concept under the creative concept of the present disclosure, and all these various changes and improvements still fall within the protection scope of the present disclosure. The description of the foregoing embodiments is illustrative rather than restrictive, and the protection scope of the present disclosure is determined by the appended claims.

The invention claimed is:

1. A connector device, comprising a floating connector assembly and a mating connector assembly, wherein the floating connector assembly comprises a base, a floating connector and a first floating unit, wherein the base defines a base plane and comprises an accommodating space for accommodating the first floating unit, and the first floating unit comprises a through hole for receiving the floating connector and is configured to allow the floating connector to move in a radial direction of the through hole and to tilt relative to an axial direction of the through hole, wherein the mating connector assembly comprises a mating connector adapted to be connected with the floating connector, wherein the floating connector comprises a valve assembly, the mating connector comprises a valve unit, and the valve assembly and the valve unit are configured to both switch to an open state when the floating connector is connected with the mating connector, such that flow paths of the floating connector and the mating connector are both opened, wherein the floating connector assembly further comprises a second floating unit mounted to the base and configured to be movable relative to the base in a direction perpendicular to the base plane, and wherein the connector device is configured such that the second floating unit is movable to varied floating positions relative to the base after the valve assembly and the valve unit are both switched to the open state, so as to compensate for assembly deviations in the direction perpendicular to the base plane.

2. The connector device according to claim 1, wherein the base comprises a receiving cavity, and the second floating unit comprises an enclosure and an elastic member, wherein the enclosure is movable relative to the receiving cavity in the direction perpendicular to the base plane, and the enclosure and the receiving cavity together define a receiving space, and wherein the elastic member is arranged in the receiving space to bias the enclosure in a direction away from the base.

3. The connector device according to claim 2, wherein the second floating unit further comprises an externally threaded fastener and a fitting member, and the externally threaded fastener extends through the receiving space and is engaged with the fitting member to mount the enclosure to the base.

4. The connector device according to claim 3, wherein the enclosure is provided with an inverted conical limiting hole, and the fitting member has an outer contour matching the shape of the limiting hole, wherein the fitting member is arranged around the externally threaded fastener in the limiting hole to be limited by the limiting hole.

5. The connector device according to claim 3, wherein the fitting member is provided with a first fitting portion, and the externally threaded fastener is provided with a second fitting portion matching the first fitting portion in shape, wherein the second fitting portion establishes a form-fit with the first fitting portion.

6. The connector device according to claim 1, wherein the first floating unit is in the form of a bushing and is made of thermoplastic elastomer and/or rubber material, and at least one cavity is defined in a peripheral wall of the first floating unit.

7. The connector device according to claim 6, wherein the floating connector assembly comprises at least two floating connectors, the first floating unit correspondingly comprises at least two cylindrical portions, and each cylindrical portion defines a through hole for receiving a corresponding floating connector, wherein the at least two cylindrical portions comprise a first cylindrical portion and a second cylindrical portion whose axes are parallel to each other, and the first cylindrical portion and the second cylindrical portion intersect.

8. The connector device according to claim 1, wherein the mating connector assembly further comprises a mounting seat, and the mating connector is connected to the mounting seat, wherein the base or the mounting seat is provided with a stop portion configured to abut against the mounting seat or the base opposite to the stop portion.

9. The connector device according to claim 1, wherein the base plane is perpendicular to the axial direction of the through hole.

10. The connector device according to claim 1, wherein the floating connector assembly further comprises a mounting plate and a flexible first protective cover, wherein the mounting plate has an opening for the floating connector to pass through, the floating connector is held on the base by means of the mounting plate, and the first protective cover is arranged around the floating connector to cover a gap between the floating connector and an edge of the opening.

11. The connector device according to claim 1, wherein the floating connector assembly further comprises a flexible first protective cover, wherein the first protective cover is arranged around the floating connector to cover a gap between the floating connector and the base.

12. The connector device according to claim 1, wherein the connector device further comprises a second protective cover, and the second protective cover is arranged to cover a junction where the floating connector is connected to the mating connector.

\* \* \* \* \*